(12) United States Patent
Rao et al.

(10) Patent No.: US 9,396,724 B2
(45) Date of Patent: Jul. 19, 2016

(54) METHOD AND APPARATUS FOR BUILDING A LANGUAGE MODEL

(71) Applicant: Tencent Technology (Shenzhen) Company Limited, Shenzhen (CN)

(72) Inventors: Feng Rao, Shenzhen (CN); Li Lu, Shenzhen (CN); Bo Chen, Shenzhen (CN); Xiang Zhang, Shenzhen (CN); Shuai Yue, Shenzhen (CN); Lu Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 227 days.

(21) Appl. No.: 14/181,263

(22) Filed: Feb. 14, 2014

(65) Prior Publication Data

US 2014/0358539 A1    Dec. 4, 2014

Related U.S. Application Data

(63) Continuation of application No. PCT/CN2013/089588, filed on Dec. 16, 2013.

(30) Foreign Application Priority Data

May 29, 2013 (CN) .......................... 2013 1 0207237

(51) Int. Cl.
G10L 15/06 (2013.01)
G10L 15/183 (2013.01)
G10L 15/197 (2013.01)

(52) U.S. Cl.
CPC ............. G10L 15/063 (2013.01); G10L 15/183 (2013.01); *G10L 15/197* (2013.01)

(58) Field of Classification Search
CPC ............ G06F 17/30705; G06F 17/248; G06F 17/30707; G06F 17/3071; G06F 17/30713; G06F 17/30598; G06F 17/30011; G06F 17/30613; G06F 17/3087; G06F 17/2818; G06F 17/2775; G06F 17/2881; G06F 17/21; G06F 17/2735; G06F 17/30684; G06F 17/2715; G10L 15/08; G10L 15/06; G10L 15/1815; G10L 15/183; G10L 15/19; G10L 15/26; G10L 15/18; G10L 15/193
USPC ............... 704/1–10, 250, 251, 255, 257, 270, 704/243, 235, 244, 245
See application file for complete search history.

(56) References Cited

U.S. PATENT DOCUMENTS

| | | | |
|---|---|---|---|
| 2003/0140309 A1* | 7/2003 | Saito ................ | G06F 17/30616 715/259 |
| 2004/0210434 A1 | 10/2004 | Wang et al. | |
| 2013/0013289 A1* | 1/2013 | Myaeng ............. | G06F 17/2785 704/9 |
| 2013/0226559 A1* | 8/2013 | Lim .................... | G06F 17/2785 704/9 |

FOREIGN PATENT DOCUMENTS

| | | |
|---|---|---|
| CN | 102779508 A | 11/2012 |
| CN | 102999516 A | 3/2013 |

OTHER PUBLICATIONS

Tencent Technology, ISR, PCT/CN2013/089588, Mar. 20, 2014, 3 pgs.

* cited by examiner

*Primary Examiner* — Huyen Vo
(74) *Attorney, Agent, or Firm* — Morgan, Lewis & Bockius LLP

(57) ABSTRACT

A method includes: acquiring data samples; performing categorized sentence mining in the acquired data samples to obtain categorized training samples for multiple categories; building a text classifier based on the categorized training samples; classifying the data samples using the text classifier to obtain a class vocabulary and a corpus for each category; mining the corpus for each category according to the class vocabulary for the category to obtain a respective set of high-frequency language templates; training on the templates for each category to obtain a template-based language model for the category; training on the corpus for each category to obtain a class-based language model for the category; training on the class vocabulary for each category to obtain a lexicon-based language model for the category; building a speech decoder according to an acoustic model, the class-based language model and the lexicon-based language model for any given field, and the data samples.

20 Claims, 9 Drawing Sheets

METHOD AND APPARATUS FOR BUILDING A LANGUAGE MODEL

RELATED APPLICATIONS

This application is a continuation application of PCT Patent Application No. PCT/CN2013/089588, entitled "METHOD AND APPARATUS FOR BUILDING A LANGUAGE MODEL" filed Dec. 16, 2013, which claims priority to Chinese Patent Application No. 201310207237.2, "METHOD AND APPARATUS FOR BUILDING A LANGUAGE MODEL", filed May 29, 2013, both of which are hereby incorporated by reference in their entirety.

FIELD OF THE INVENTION

The present invention relates to the technical field of speech recognition, and in particular, to a method and an apparatus for building language models.

BACKGROUND OF THE INVENTION

With development of the speech recognition technology and the mobile Internet technology in recent years, the application range of the speech recognition technology is increasingly wide. When a speech recognition function is implemented, a speech recognition decoder is usually used to decode speech data, and the speech recognition decoder, during decoding, uses acoustic models and language models to achieve conversion from speech to text. Therefore, how to build a language model is the key to improving the accuracy of speech recognition.

Currently, when a language model is built, initial language training samples covering many fields (e.g., travel, entertainment, food, politics, sports, life, medicine, etc.) are obtained by performing data mining on a dictionary, and the language training samples are used for training to obtain the language model. In the meantime, with continuous refinement of the field divisions, the number of fields (also referred as "verticals") is continuously increased. In order to ensure that the language model obtained is a more balanced multi-vertical-field language model, an interpolation method with fixed weights for respective vertical fields is continuously performed on the initial speech training samples, so that the language models trained on the training samples covers a large number of vertical fields.

The current technology of building a language model has at least the following problems:

As the initial speech training samples are obtained by performing data mining on a dictionary, in order that the initial language training samples could cover more fields, it is necessary to increase the capacity of the dictionary, to enable the dictionary to cover more fields. This increases the difficulty of access to the dictionary, thereby increasing the difficulty of building language models.

Besides, when the initial speech training samples are expanded with the interpolation method with fixed weights for respective vertical fields, it is very difficult for the interpolated training samples to include terminology, uncommon words and unpopular words in a vertical field, so that the language model built according to the language training samples is inaccurate for producing identification results of the vertical field, thereby reducing the accuracy of speech recognition system.

SUMMARY

In one aspect, a method of building a language model includes: at a device having one or more processors and memory: acquiring data samples for building the language model; performing categorized sentence mining in the acquired data samples to obtain mining results comprising a respective set of sentences obtained through the categorized sentence mining for each of a plurality of categories; obtaining categorized training samples based on the mining results; building a text classifier based on the categorized training samples; classifying the data samples using the text classifier to obtain a respective class vocabulary and a respective training corpus for each of a plurality of categories; mining the respective training corpus for each category according to the respective class vocabulary for the category to obtain a respective set of high-frequency language templates; performing training on the respective set of high-frequency language templates for each category to obtain a respective template-based language model for the category; performing training on the respective training corpus for each category to obtain a respective class-based language model for the category; and performing training on the respective class vocabulary for each category to obtain a respective lexicon-based language model. The method further includes: building a speech to text decoder according to a previously obtained acoustic model, the respective class-based language model and the respective lexicon-based language model for the given field, and the data samples.

In some embodiments, the method further includes: obtaining speech features of speech data; inputting the speech features into respective speech-to-text decoders for multiple fields in parallel, to obtain respective speech recognition results in the multiple fields; calculating respective confidence scores of the acoustic model in the multiple fields, respective confidence scores of the respective class-based language models in the multiple fields and respective category scores corresponding to the multiple fields, according to the respective speech recognition results in the multiple fields; based on the respective confidence scores of the acoustic model in the multiple fields, the respective confidence scores of the respective class-based language models in the multiple fields, and the respective category scores corresponding to the multiple fields, acquiring respective integrated scores for the respective speech recognition results in the multiple fields; and selecting one speech recognition result from the respective speech recognition results in the multiple fields as an ultimate speech recognition result according to the respective integrated scores for the respective speech recognition results in the multiple fields.

In another aspect, a device comprises one or more processors, memory, and one or more program modules stored in the memory and configured for execution by the one or more processors. The one or more program modules including instructions for performing the method described above. In another aspect, a non-transitory computer readable storage medium having stored thereon instructions, which, when executed by a device, cause the device to perform the method described above.

Various other aspects and advantages of the invention are apparent in light of the descriptions below

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. However it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
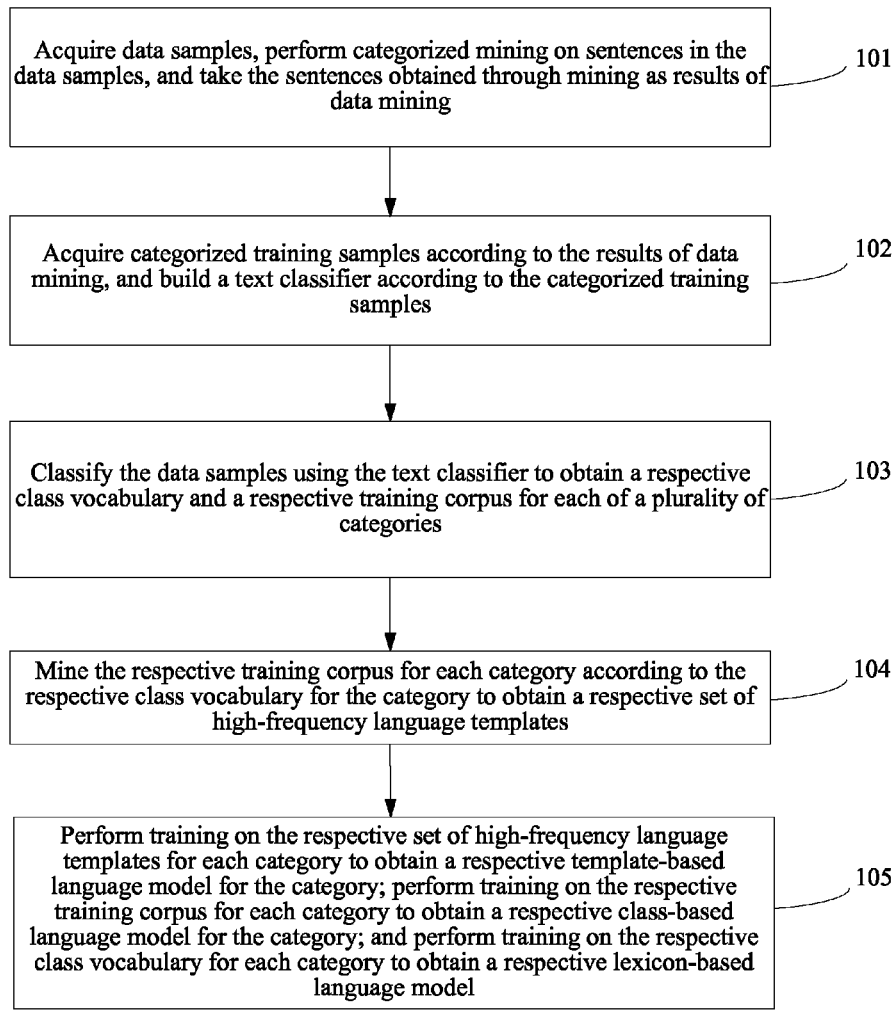
FIG. 1 is a flow chart of a method for building language models in accordance with some embodiments.

FIG. 1 is a flow chart of a method for building language models in accordance with some embodiments. The method includes the following steps:

101: Acquire data samples, perform categorized sentence mining on sentences in the data samples, and take the sentences obtained through mining as results of data mining, where the mining results include a respective set of sentences obtained through the categorized sentence mining for each of a plurality of categories.

102: Acquire categorized training samples according to the results of data mining, and build a text classifier according to the categorized training samples.

In some embodiments, obtaining categorized training samples based on the mining results further includes: obtaining frequency statistics for the sentences obtained through the categorized sentence mining; sorting the sentences in each category according to the frequency statistics; and selecting respective training samples for each category from the sentences obtained through the categorized sentence mining according to a result of the sorting.

Further, in some embodiments, building the text classifier based on the categorized training samples further include: obtaining statistical information on a tf-idf (Term Frequency-Inverse Document Frequency) feature and mutual information for the sentences in the respective training samples for each category; and building the text classifier according to the obtained statistical information.

103: Classify the data samples using the text classifier to obtain a respective class vocabulary and a respective training corpus for each of a plurality of categories.

Further, in some embodiments, classifying the data samples using the text classifier to obtain the respective class vocabulary and the respective training corpus for each of a plurality of categories further includes: mining for sentences with a high degree of similarity in the data samples through the text classifier to obtain classification results comprising highly similar sentences.

In some embodiments, classifying the data samples using the text classifier to obtain the respective class vocabulary and the respective training corpus for each of a plurality of categories further includes: obtaining term frequency statistics on sentences in the classification results; selecting class words according to the term frequency statistics to obtain the respective class vocabulary for each of the plurality of categories; and taking sentences corresponding to the class words in the respective class vocabulary for each category as the respective training corpus for the category.

104: Mine the respective training corpus for each category according to the respective class vocabulary for the category to obtain a respective set of high-frequency language templates.

105: Perform training on the respective set of high-frequency language templates for each category to obtain a respective template-based language model for the category; perform training on the respective training corpus for each category to obtain a respective class-based language model for the category; and perform training on the respective class vocabulary for each category to obtain a respective lexicon-based language model.

Further, in some embodiments, the respective template-based language model, the respective class-based language model, and the respective lexicon-based language model for a given category are language models for a given field (e.g., the sports field or the medicine field), and the method further includes: building a speech to text decoder according to a previously obtained acoustic model, the respective class-based language model and the respective lexicon-based language model for the given field, and the data samples.

Further, in some embodiments, building the speech to text decoder according to the previously obtained acoustic model, the respective class-based language model and the respective lexicon-based language model for the any given field, and the data samples, further includes: performing weighted finite state transduction on the respective class-based language model in the given field, to obtain a respective class-based language model WFST (Weighted Finite State Transducer); performing weighted finite state transduction on the respective lexicon-based language model in the given field, to obtain a respective class vocabulary WFST; performing weighted finite state transduction on the respective class-based language model WFST and the respective class vocabulary WFST in the given field, to obtain a fused language model WFST; performing weighted finite state transduction on the data samples, to obtain a respective vocabulary WFST; performing weighted finite state transduction on the vocabulary WFST and the fused language model WFST, to obtain a vocabulary language WFST; performing weighted finite state transduction on the acoustic model, to obtain an acoustic model WFST; performing weighted finite state transduction on the acoustic model WFST and the vocabulary language WFST, to obtain an ultimate WFST; and taking the ultimate WFST as the speech-to-text decoder in the given field.

Further, in some embodiments, after performing weighted finite state transduction on the acoustic model WFST and the vocabulary language WFST to obtain an ultimate WFST, and taking the ultimate WFST as the speech-to-text decoder in the given field, the method further includes: obtaining speech features of speech data; and inputting the speech features into the speech-to-text decoder for the given field to obtain a respective speech recognition result in the given field.

Optionally, in some embodiments, after performing weighted finite state transduction on the acoustic model WFST and the vocabulary language WFST to obtain an ultimate WFST, and taking the ultimate WFST as the speech-to-text decoder in the given field, the method further includes: obtaining speech features of speech data; inputting the speech features into respective speech-to-text decoders for multiple fields in parallel, to obtain respective speech recognition results in the multiple fields; calculating respective confidence scores of the acoustic model in the multiple fields, respective confidence scores of the respective class-based language models in the multiple fields and respective category scores corresponding to the multiple fields, according to the respective speech recognition results in the multiple fields; based on the respective confidence scores of the acoustic model in the multiple fields, the respective confidence scores of the respective class-based language models in the multiple fields, and the respective category scores corresponding to the multiple fields, acquiring respective integrated scores for the respective speech recognition results in the multiple fields; and selecting one speech recognition result from the respective speech recognition results in the multiple fields as an ultimate speech recognition result according to the respective integrated scores for the respective speech recognition results in the multiple fields.

Further, in some embodiments, calculating respective confidence scores of the acoustic model in the multiple fields according to the respective speech recognition results in the multiple fields includes: aligning the respective speech recognition results in the multiple fields; respectively calculating the respective confidence scores of the aligned speech recognition results in the multiple fields on the phoneme level; and calculating respective confidence scores of the speech recognition results in the multiple fields on the keyword level according to the confidence scores of the speech recognition results in the multiple fields on the phoneme level; and, then, selecting one confidence score of the speech recognition result in each field from the respective confidence scores of the speech recognition results in the multiple fields on the keyword level, according to the respective confidence scores on the keyword level, as the respective confidence scores of the acoustic model in the multiple fields.

Further, in some embodiments, respectively calculating the respective confidence scores of the aligned speech recognition results in the multiple fields on the phoneme level includes: calculating the respective confidence score values of the aligned speech recognition results in the multiple fields on the phoneme level according to a formula $$CM(ph_i) = \frac{1}{e[i] - b[i] + 1} \sum_{n=b[i]}^{e[i]} \log \frac{p(o^{(n)} \mid q^{(n)}) p(q^{(n)})}{p(o^{(n)})};$$

where $ph_i$ is the ith phoneme, wherein the phoneme starts from a start frame and ends to an end frame, b[i] is the start frame of $ph_i$, e[i] is the end frame of $ph_i$, $o^{(n)}$ is the observation sequence corresponding to $ph_i$, and $q^{(n)}$ is the state sequence corresponding to $ph_i$.

Further, in some embodiments, calculating respective confidence scores of the speech recognition results in the multiple fields on the keyword level according to the confidence scores of the speech recognition results in the multiple fields on the phoneme level includes: calculating the respective confidence score values of the speech recognition results in the multiple fields on the keyword level according to a formula $$CM(w) = \frac{1}{m} \sum_{i=1}^{m} CM(ph_i);$$

where m is the number of phonemes included in the keyword w.

Further, in some embodiments, selecting one confidence score value of keyword levels of the speech recognition results in respective fields from the confidence score values of multiple keyword levels of the speech recognition results in respective fields according to the confidence score values of the keyword levels as the confidence score values of the acoustic model in respective fields includes: selecting a maximum confidence score value the speech recognition results on the keyword level in a respective field as a respective confidence score value of the acoustic model in the field according to a formula $$CM(w_i) = \max_{Tr_p(w_i)} \frac{1}{N(S(w_i))} \sum_j CM(Tr_p(w_i) \mid S_j(w_i));$$

where $S_j(w_i)$ is the jth audio sample for acoustic model training, $Tr_p(w_i)$ is the ith pronunciation sequence in the jth audio sample, and $N(S(w_i))$ is the number of the audio samples.

Further, in some embodiments, calculating the respective confidence scores of the respective class-based language models in the multiple fields according to the respective speech recognition results in the multiple fields further includes: calculating confidence score values of the class-based language model in a respective given field according to a formula $$ppl = \log \left( \prod_{i=1}^{} p(t_i) \right) \Big/ Sen + \text{Word};$$

where $t_i$ denotes the ith word, Sen denotes the total number of sentences in the speech recognition results in the given field, and Word denotes the total number of words in the sentences.

Further, in some embodiments, calculating the respective category scores corresponding to the multiple fields according to the respective speech recognition results in the multiple fields further includes: respectively obtaining a respective set of keywords from the respective speech recognition results in the multiple respective fields, and determining a respective recognition score W1 for each respective field according to a respective frequency of occurrence of the respective set of keywords in the respective class vocabulary of the respective field; respectively putting the respective speech recognition results in each respective field into the text classifier, to obtain a respective text classification probability weight W2 for the respective field; respectively recognizing a respective set of entity words (e.g., proper nouns, entity names, etc.) in the speech recognition results in each respective field, and determining a respective recognition score W3 according to a frequency of occurrence of the respective set of entity words in the respective class vocabulary of the respective field; and calculating a respective category score value of the respective field according to a formula W=W1+W2+W3, and taking the respective category score values as respective category scores corresponding to the multiple respective fields.

Further, in some embodiments, based on the respective confidence scores of the acoustic model in the multiple fields, the respective confidence scores of the respective class-based language models in the multiple fields, and the respective category scores corresponding to the multiple fields, acquiring respective integrated scores for the respective speech recognition results in the multiple fields, further includes: acquiring a respective integrated score value of the speech recognition results in each respective field according to a formula $$score=\alpha*CM(w_i)+\beta*ppl+\gamma(W);$$

where $\alpha$, $\beta$ and $\gamma$ are any value not less than zero, CM ($w_i$) is the respective confidence score value of the acoustic model in the respective field, ppl is the respective confidence score value of the class-based language model in the respective field, and W is the corresponding category score of the respective field.

Further, in some embodiments, selecting one speech recognition result from the respective speech recognition results in the multiple fields as an ultimate speech recognition result according to the respective integrated scores for the respective speech recognition results in the multiple fields further includes: selecting a speech recognition result corresponding to a maximum integrated score value from the respective speech recognition results in the multiple fields as an ultimate speech recognition result according to the integrated score values in the multiple fields.

In the method provided herein, by mining sentences in data samples, acquiring a class vocabulary, a class corpus, and a set of high-frequency language templates for each field, and training them to obtain a field-specific template-based language model, a field-specific class-based language model, and a class-specific lexicon-based language model, the number of language models can be increased without increasing the number of data samples, thereby improving the accuracy of using the field-specific template-based language models, the field-specific class-based language models, and the field-specific lexicon-based language model for speech recognition.

Figure 2:
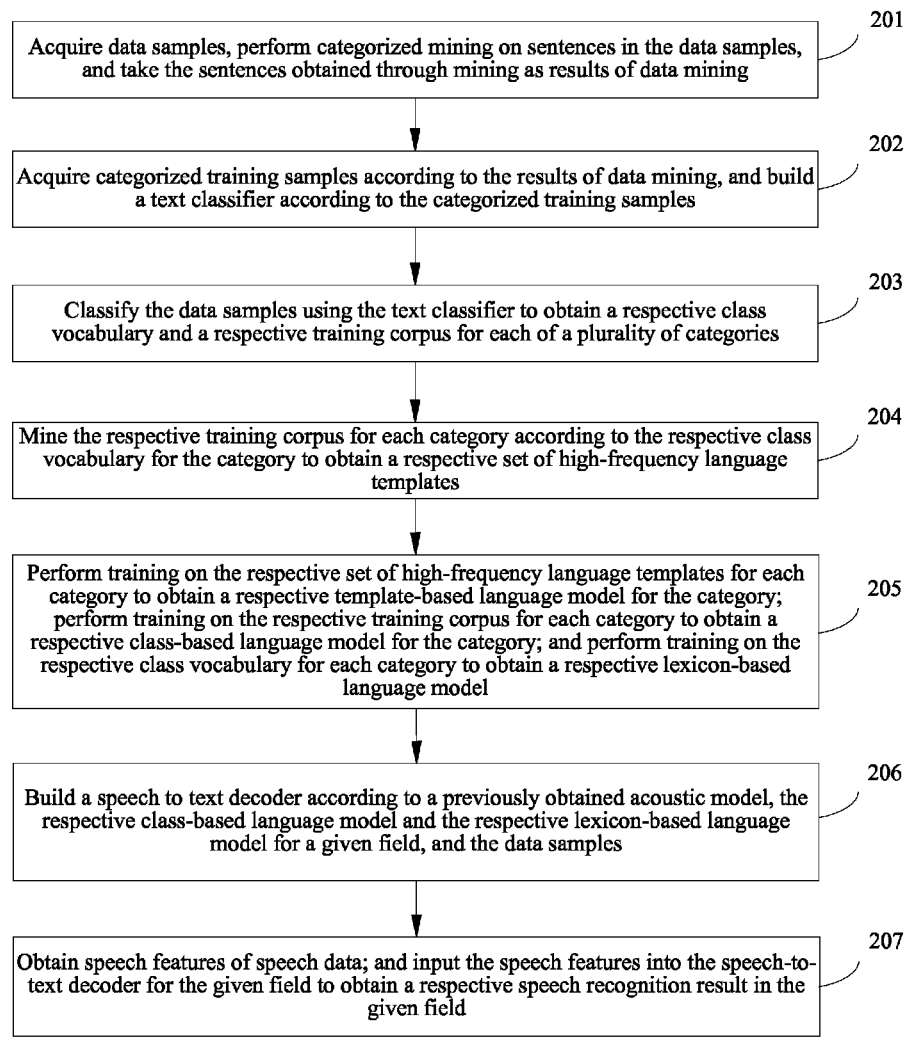
FIG. 2 is a flow chart of a method for building language models in accordance with some embodiments.

In order to more clearly elaborate the method for building language models provided above, in combination with content of the above embodiment, a method for building language models is described in detail with respect to FIG. 2.

A flow of the method provided in this embodiment is specifically as follows.

201: Acquire data samples, perform categorized sentence mining on sentences in the data samples, and take the sentences obtained through mining as results of data mining, where the mining results include a respective set of sentences obtained through the categorized sentence mining for each of a plurality of categories.

With respect to this step, in some embodiments, each field is takes as a class or category according to different fields, and categorized sentence mining is performed on the acquired data samples, to take sentences of each category obtained through mining as the results of data mining of the category. The specific method of acquiring data samples includes, but is not limited to, using a network crawling technology to crawl articles or paragraphs in respective fields over a network, and taking the crawled articles or paragraphs in respective fields as the acquired data samples. Multiple specific classification rules may be used define classes/categories according to fields, for example, fields may be classified into a map class, a digital science and technology class, and so on according to the nature of the fields. Alternatively, a large dictionary and a set of classification dictionaries can be acquired, and data in the dictionary is taken as the data samples. In addition, other methods for acquiring samples can be used, and this embodiment does not limit the specific method for acquiring the data samples.

Besides, more than one methods for mining sentences in the data samples can be used, which include, but is not limited to, using a maximum A posteriori matching algorithm to mine sentences in the data samples.

It should be noted that, when the data mining results of a category are obtained through the data mining, a respective language model of the category (or class, or field) can be built according to a method including the following step 202 to step 205, to obtain a respective template-based language model for the category, a respective class-based language model for the category, and a lexicon-based language model for the category. When the respective minding results obtained through data mining are multiple classes of mining results, for each class of data mining results, a respective language model of the class can be built according to a method including the following step 202 to step 205, to obtain a respective template-based language model of the class, a respective class-based language model of the class, and a lexicon-based language model of the class; and as a result, to obtain multiple template-based language models, multiple class-based language models, and multiple lexicon-based language models for the multiple fields.

For example, when the data samples cover a map field and a digital science and technology field, and thus two classes of results of data mining are obtained after the categorized sentence mining on the sentences in the data sample, which are respectively results of data mining in a map class and results of data mining in a digital science and technology class. Step 202 to step 205 are executed first with respect to the results of data mining in the map class, to obtain a respective template-based language model, a respective class-based language model, and a respective lexicon-based language model in the map class. Then, step 202 to step 205 are executed with respect to the results of data mining in the digital science and technology class, to obtain a respective template-based language model, a class-based language model, and a lexicon-based language model in the digital science and technology class. As a result, two template-based language models, two class-based language models, and two lexicon-based language models are obtained. Certainly, the fields that the data samples cover may be other fields, the number of the fields that the data samples cover may be other numbers.

202: Acquire categorized training samples according to the results of data mining, and build a text classifier according to the categorized training samples.

In some embodiments, the step of acquiring categorized training samples according to the results of data mining, and building a text classifier according to the categorized training samples, includes, but is not limited to, the following two steps:

Step 1: Obtain frequency statistics for the sentences obtained through the categorized sentence mining; and sort the sentences in each category according to the frequency statistics.

For step 1, statistics on the frequencies of occurrence of the mined sentences in the data samples are obtained, and the sentences are sorted according to sizes of the frequencies.

Step 2: Select respective training samples for each category from the sentences obtained through the categorized sentence mining according to a result of the sorting.

For step 2, according to the sorting result of the sizes of the frequencies obtained in step 1, high-frequency sentences in the mined sentences in each class are taken as respective training samples for the class. This embodiment does not limit the specific standard of determining the high-frequency sentences. In some embodiments, for example, a frequency threshold is set, and sentences whose frequency values are greater than or equal to the frequency threshold are determined as high-frequency sentences.

For example, in some embodiments, suppose that the mined sentences for a given class are Sentence 1, Sentence 2, Sentence 3, the frequency of Sentence 1 is 10%, the frequency of Sentence 2 is 5%, the frequency of Sentence 3 is 3%, and the frequency threshold is 5%, the result of sorting the mined sentences according to frequencies in a descending order is Sentence 1, Sentence 2, Sentence 3. As the frequency of Sentence 1 (10%) is greater than the frequency threshold (5%), the frequency of Sentence 2 (5%) is equal to the frequency threshold (5%), and the frequency of Sentence 3 (3%) is less than the frequency threshold (5%), Sentence 1 and Sentence 2 are selected as the training samples for the given class. Certainly, the mined sentences may be other sentences, and this embodiment does not limit the specific mined sentences; the frequency threshold value may be other values, and this embodiment does not specifically limit the frequency threshold value.

In addition, in various embodiments, various methods for building a text classifier according to the training samples for each class may be used, which includes, but is not limited to, performing tf-idf feature and mutual information statistics on sentences in the class training samples, and building a text classifier according to the statistics results.

203: Classify the data samples using the text classifier to obtain a respective class vocabulary and a respective training corpus for each of a plurality of categories.

For this step, first mine for sentences with a high degree of similarity in the data samples through the text classifier, and take the highly similar sentences as the classification results; and then obtaining term frequency statistics on sentences in the classification results; selecting class words according to the term frequency statistics to obtain the respective class vocabulary for each of the plurality of categories; and taking sentences corresponding to the class words in the respective class vocabulary for each category as the respective training corpus for the category.

This embodiment does not limit the specific standard of determining the sentences with high degree of similarity. For example, in some embodiments, a similar threshold can be set, each sentence is segmented into words, and sentences with the number of the same word greater than or equal to the similar threshold are determined to be sentences with a high degree of similarity to one another. This embodiment does not limit the specific method of obtaining a class vocabulary, which includes, but is not limited to, performing tf-idf feature statistics on words in the sentences with high degree of similarity, and selecting words with a high term frequency as words in the class vocabulary, to obtain a classification vocabulary for the class.

It should be noted that, in order to sufficiently mine the data samples, step 201 to step 203 can be repeatedly executed before execution of step 204, to continually expand the class vocabulary and the class training corpus for each field, until the class vocabulary and the class training corpus for each field is no longer expandable through the repeated iterations. This embodiment does not limit the method for judging whether the class vocabulary and the class training corpus are no longer expandable. In some embodiments, if the class vocabulary and the class training corpus that are mined consecutively in two iterations are the same in accordance with predetermined similarity criteria, it is determined that the class vocabulary and the class training corpus are no longer expandable.

204: Mine the respective training corpus for each category according to the respective class vocabulary for the category to obtain a respective set of high-frequency language templates.

For the step, this embodiment does not limit the specific method of mining the class training corpus according to the class vocabulary. For example, if each sentence has a label capable of representing a usage scenario of the sentence, labels corresponding to the class training corpus for a given class can be mined from the class training corpus and the labels are taken as a respective set of high-frequency speech templates for the given class. Certainly, the labels also can represent other information, and this embodiment does not limit the specific content of the labels.

For example, in some embodiments, suppose that the class training corpus is Sentence 1 and Sentence 2, the label of Sentence 1 is Label 1, and the label of Sentence 2 is Label 2. Label 1 and Label 2 are taken as high-frequency speech templates.

205: Perform training on the respective set of high-frequency language templates for each category to obtain a respective template-based language model for the category; perform training on the respective training corpus for each category to obtain a respective class-based language model for the category; and perform training on the respective class vocabulary for each category to obtain a respective lexicon-based language model.

For the step, this embodiment does not limit the specific method for training the high-frequency language templates, training the class training corpus, and training the class vocabulary. For example, a neural network technology can be used to train on the high-frequency language template, train on the class training corpus, and train on the class vocabulary.

Further, in order to make the coverage of the language models for a field more comprehensive, it is also feasible to, after training on the high-frequency language templates to obtain a respective template-based language model and training on the class vocabulary to obtain a respective lexicon-based language model, combine the obtained template-based language model and lexicon-based language model to obtain a respective fused language model for the field. To expand the fused language model obtained through the combination, the fused language model is combined with the class-based language model obtained through training, to obtain an ultimate language model for the field. This embodiment does not limit the specific method for expanding the fused language model obtained through the combination into the class-based language model obtained through training, which includes, but is not limited to, the following method: adding a label after each template in the template-based language model for a given class, to indicate which words in the lexicon-based language model can be combined with the template; and adding a label before each word in the lexicon-based language model, to indicate which templates in the template-based language model can be combined with the word. When the template-based language model and the lexicon-based language model are combined, classification templates and words having the same label are combined to obtain a sentence, and the obtained sentence is expanded into the class-based language model. This embodiment does not limit the specific adding rule of the label added after each template and the label added before each word, for example, a label can be added according to a scenario of a template or a word.

It should be noted that, after a language model is obtained through the above step 201 to step 205, the language model can be applied to the field of speech recognition, thus, optionally, the method provided in this embodiment also includes building a speech decoder according to the classification template language model and the lexicon-based language model in the obtained language model as well as the data samples when building the language model; please refer to the following steps for the process of implementing speech recognition through the decoder.

206: Build a speech to text decoder according to a previously obtained acoustic model, the respective class-based language model and the respective lexicon-based language model for a given field, and the data samples used when building the language models.

For this step, after execution of step 201 to step 205, the respective class-based language models and respective lexicon-based language models in multiple fields may be built. A speech decoder is built according to the acoustic model acquired previously, the respective class-based language model and the lexicon-based language model in each given field built according to step 201 to step 205, and the data samples used when building the speech models of the given field. The acoustic model acquired previously describes the feature probability distribution of each phoneme or triphone model. A phoneme is the smallest unit of speech classified according to the nature of the speech, in terms of its acoustic properties. The phoneme is the smallest unit of speech classified in terms of acoustic quality. In terms of the physiological property, a sound articulation action forms a phoneme. In some embodiments, the acoustic model may be hidden Markov models commonly used in speech recognition. The hidden Markov model is a statistical model, which is used to describe a Markov process containing hidden unknown parameters. In the hidden Markov model, the state is not directly visible, and certain variables affected by the state are visible.

Figure 3:
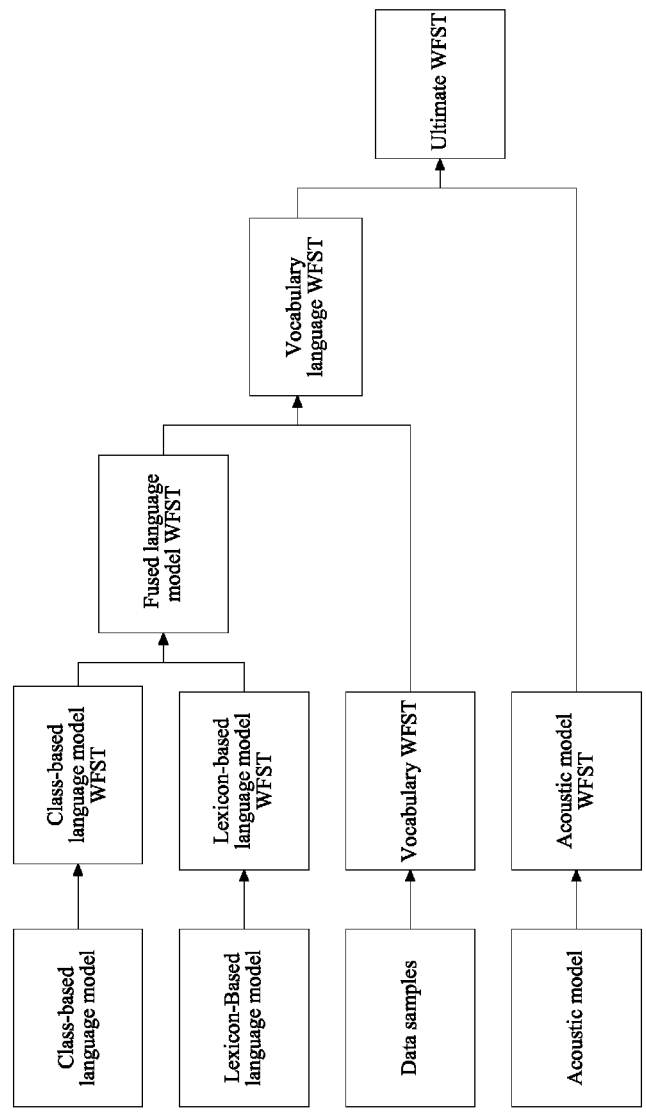
FIG. 3 is a schematic view of a process for building a speech-to-text decoder in accordance with some embodiments.
Figure 4:
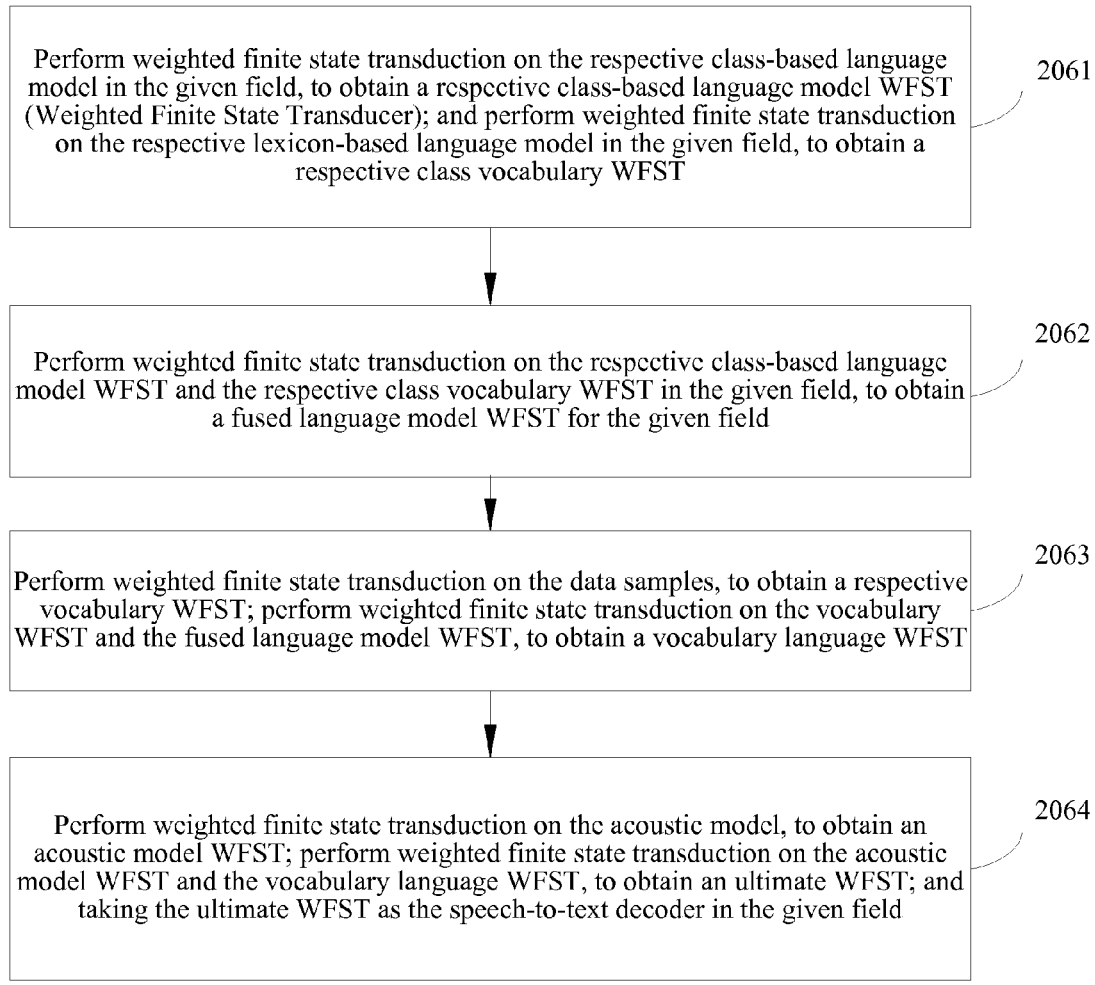
FIG. 4 is a flow chart of a method for building a speech-to-text decoder in accordance with some embodiments.

This embodiment does not limit the specific manner of building a speech decoder, and for ease of description, by taking the schematic view of building a speech decoder in FIG. 3 as an example, the specific method for building a speech decoder is described in detail, and referring to FIG. 4, the specific method for building a speech decoder is as follows.

2061: Perform weighted finite state transduction on the respective class-based language model in the given field, to obtain a respective class-based language model WFST (Weighted Finite State Transducer); and perform weighted finite state transduction on the respective lexicon-based language model in the given field, to obtain a respective class vocabulary WFST.

For this step, as a class-based language model and a lexicon-based language model may be obtained when building the language model, weighted finite state transduction is performed on the class-based language model in any given field, to obtain a class-based language model WFST for the given field, and weighted finite state transduction is performed on the lexicon-based language model for the given field, to obtain a class vocabulary WFST for the given field.

2062: Perform weighted finite state transduction on the respective class-based language model WFST and the respective class vocabulary WFST in the given field, to obtain a fused language model WFST for the given field.

For this step, weighted finite state transduction is performed on the class-based language model WFST and the class vocabulary WFST obtained in step 2061 for each given field, to obtain a respective fused language model WFST for the given field.

2063: Perform weighted finite state transduction on the data samples, to obtain a respective vocabulary WFST; perform weighted finite state transduction on the vocabulary WFST and the fused language model WFST, to obtain a vocabulary language WFST.

For this step, weighted finite state transduction is performed on the data samples used when building the language models of each given field, to obtain a vocabulary WFST for the given field, and weighted finite state transduction is performed on the vocabulary WFST and the fused language model WFST obtained in step 2062 for each given field, to obtain a vocabulary language WFST for the field.

2064: Perform weighted finite state transduction on the acoustic model, to obtain an acoustic model WFST; perform weighted finite state transduction on the acoustic model WFST and the vocabulary language WFST, to obtain an ultimate WFST; and taking the ultimate WFST as the speech-to-text decoder in the given field.

For this step, an acoustic model is acquired, weighted finite state transduction is performed on the acquired acoustic model, to obtain an acoustic model WFST, weighted finite state transduction is performed on the acoustic model WFST and the vocabulary language WFST obtained in step 2063 for each given field, to obtain an ultimate WFST for the given field, and the ultimate WFST for each given field is taken as a speech decoder in the given field. This embodiment does not limit the specific manner of acquiring the acoustic model. For example, an acoustic model may be obtained through training according to acoustic training samples, and this embodiment does not limit the specific training samples and specific training method of the acoustic model.

It should be noted that, when a speech decoder is built, weighted finite state transduction can be performed on each model or sample respectively, to obtain WFST corresponding to the model or sample. For example, weighted finite state transduction can be performed on a class-based language model to obtain a class-based language model WFST corresponding to the class-based language model; weighted finite state transduction can be performed on a lexicon-based language model to obtain a classification vocabulary WFST corresponding to the lexicon-based language model; weighted finite state transduction can be performed on a set of data samples to obtain a vocabulary WFST corresponding to the data samples; and weighted finite state transduction can be performed on an acoustic model to obtain an acoustic model WFST corresponding to the acoustic model.

It is also feasible to perform weighted finite state transduction on the WFST corresponding to each model obtained through weighted finite state transduction, to obtain corresponding WFST, until various models are transduced into an ultimate WFST. For example, weighted finite state transduction can be performed on a class-based language model WFST and a classification vocabulary WFST in any given field, to obtain a corresponding fused language model WFST for the given field; weighted finite state transduction can be performed on a vocabulary WFST and the fused language model WFST for any given field, to obtain a corresponding vocabulary language WFST for the given field; and weighted finite state transduction can be performed on the acoustic model WFST and the vocabulary language WFST for any given field, to obtain a corresponding ultimate WFST for the given field.

In addition, if, after step 205, a template-based language model, a class-based language model and a lexicon-based language model in one field are built, a speech decoder is built by using the method of step 2061 to step 2064 according to the template-based language model, class-based language model and lexicon-based language model. If, after step 205, template-based language models in multiple fields, class-based language models in multiple fields, and lexicon-based language models in multiple fields are built, a speech decoder in each field is built by using the method of step 2061 to step 2064 according to the respective template language model, class-based language model and lexicon-based language model in the field, to finally obtain multiple respective speech decoders for the multiple fields, wherein each speech decoder corresponds to one field. Besides, in the execution of step 2061 to step 2064, weighted finite state transduction can be performed on corresponding models and data samples through the existing weighted finite state transduction method, and this embodiment does not limit the specific method for performing weighted finite state transduction.

After a speech decoder is obtained through step 206, the speech decoder can be applied to the field of speech recognition for speech recognition. Optionally, the method provided in this embodiment further includes a process of performing speech recognition according to the built speech decoder; please refer to the following steps for the specific method.

207: Obtain speech features of speech data; and input the speech features into the speech-to-text decoder for any given field to obtain a respective speech recognition result in the given field.

For this step, this embodiment does not limit the specific manner of acquiring speech features of speech data. For example, speech data can be obtained through a microphone on a smart device, and speech features corresponding to the acquired speech data are acquired.

In addition, during specific implementation of the step of inputting the speech features into the speech decoder to obtain a speech recognition result, one of the following two specific implementation steps is selected according to the number of the speech decoder.

The first specific implementation step: if the number of the speech decoders is one, the specific implementation step of inputting the speech features into the speech decoder to obtain a speech recognition result is: inputting the speech features into the speech decoder, to obtain a speech recognition result.

For this step, if one speech decoder is obtained after step 2064, input speech features into the speech decoder, and obtain a paragraph of words to serve as a speech recognition result.

The second specific implementation step: if the number of the speech decoders is multiple (i.e., greater than one), the specific implementation step of inputting the speech features into the speech decoder(s), to obtain a speech recognition result includes the following three steps.

Step 1: Input the speech features into the respective speech decoders in multiple fields in parallel, to obtain respective speech recognition results in respective fields.

Specifically, if two speech decoders are obtained after step 2064, i.e., speech decoder 1 and speech decoder 2, input speech features into the speech decoder 1, to obtain a speech recognition result 1 of the speech decoder 1; and input the speech features into the speech decoder 2, to obtain a speech recognition result 2 of the speech decoder 2.

Step 2: Calculate the respective confidence score value of the acoustic model in each respective field, the respective confidence score value of the class-based language model in each respective field and the respective category score value corresponding to each respective field, according to the speech recognition results in the respective field.

For this step, as speech recognition results in each respective field are uneven in length, standards of calculating confidence score values of the acoustic model in the respective fields are non-uniform, so the confidence score values of the acoustic model in the respective fields calculated according to the uneven length speech recognition results in the respective fields are not comparable in the following steps. Therefore, when executing step 2, first force alignment of the speech recognition results for the same speech input in the multiple fields, so as to unify the standards of calculating the confidence score values of the acoustic model in the different fields, so that the calculated confidence score values of the acoustic models in the multiple fields have comparability in the following steps. This embodiment does not limit the specific method for force aligning the speech recognition results in the multiple fields.

Further, after compulsorily aligning the speech recognition results in the multiple fields, for any given field, the step can be specifically implemented according to the following three sub-steps.

The first sub-step: calculating respective confidence scores of the acoustic model in the multiple fields according to the respective speech recognition results in the multiple fields.

For the first sub-step, this embodiment does not limit the specific method for calculating a confidence score value of an acoustic model in each given field according to a speech recognition result in the field, which includes, but is not limited to, the following calculation method.

A speech recognition result in a given field includes multiple keywords, each keyword includes multiple phonemes, and each phoneme starts from a start frame and ends to an end frame. Thus, confidence score values of the aligned speech recognition results are calculated at the phoneme level; confidence score values of any keywords are calculated at the keyword level according to the confidence score values at the phoneme level for the phonemes in each keyword; and one keyword level confidence score value is selected from multiple keyword level confidence score values according to the keyword level confidence score values, as the confidence score value of an acoustic model in the field.

For the calculation method, this embodiment does not limit the specific calculation method for calculating confidence score values at the phoneme level. For example, $$CM(ph_i) = \frac{1}{e[i] - b[i] + 1} \sum_{n=b[i]}^{e[i]} \log \frac{p(o^{(n)} | q^{(n)}) p(q^{(n)})}{p(o^{(n)})}$$

calculates the confidence score values at the phoneme level; where $ph_i$ is the ith phoneme, $b[i]$ is the start frame of $ph_i$, $e[i]$ is the end frame of $ph_i$, $o^{(n)}$ is the observation sequence corresponding to $ph_i$, and $q^{(n)}$ is the state sequence corresponding to $ph_i$.

In addition, this embodiment does not limit the specific calculation method for calculating a keyword level confidence score value of any keyword according to the confidence score values at the phoneme level for phonemes in the keyword. For example, confidence score values at the keyword level is calculated according to a formula $$CM(w) = \frac{1}{m}\sum_{i=1}^{m} CM(ph_i);$$

where m is the number of phonemes included in the keyword w.

Besides, this embodiment does not limit the specific selection method for selecting one confidence score value at the keyword level from multiple confidence score values at the keyword level according to the keyword level confidence score values, as the confidence score value of an acoustic model in the field. For example, a maximum confidence score value at the keyword level is selected as the confidence score value of the acoustic model in the field according to a formula $$CM(w_i) = \max_{Tr_p(w_i)} \frac{1}{N(S(w_i))}\sum_{j} CM(Tr_p(w_i) | S_j(w_i));$$

where $S_j(w_i)$ is the jth audio sample for the acoustic model training, $Tr_p(w_i)$ is the ith pronunciation sequence in the jth audio sample, and $N(S(w_i))$ is the number of the audio samples.

The second sub-step: calculate a confidence score value of a language model in any given field according to a speech recognition result in the field.

For the second sub-step, this embodiment does not limit the specific calculation method for calculating a confidence score value of a language model in any field according to a speech recognition result in the field. For example, calculate a confidence score value of a language model according to a formula $$ppl = \log\left(\prod_{i=1} p(t_i)\right) / Sen + \text{Word};$$

where $t_i$ denotes the ith word, Sen denotes the total number of sentences in the speech recognition result in a given field, and Word denotes the total number of words in the sentences.

The third sub-step: calculate a category score value corresponding to a given field according to a speech recognition result in the field.

For the third sub-step, this embodiment does not limit the calculation method for calculating a category score value corresponding to a given field according to a speech recognition result in the field. For example, a keyword of the speech recognition result in the field is obtained, and a recognition score W1 is determined according to a frequency of occurrence of the keyword in the class vocabulary in the field; the speech recognition result in the field is put into the text classifier, to obtain a text classification probability weight W2; a entity word in the speech recognition result in the field are recognized, and a recognition score W3 is determined according to a frequency of occurrence of the entity word in the classification vocabulary in the field; and a category score value is calculated according to a formula W=W1+W2+W3, and the category score value is taken as the category score value corresponding to the field. This embodiment does not limit the method for acquiring key words of the speech recognition result in the field, which includes, but is not limited to, calculating a semantic distance between each word by separating words of the speech recognition result in the field, and selecting words with a maximum semantic distance from others as key words. In addition, this embodiment does not limit the specific method for determining a recognition score W1 according to a frequency of occurrence of the keyword in the class vocabulary in the field. For example, take a frequency value of occurrence of the keyword in the class vocabulary in the field as a recognition score W1. This embodiment does not limit the specific method for determining a recognition score W3 according to a frequency of occurrence of the entity word in the class vocabulary in the field. For example, take a frequency value of occurrence of the entity word in the class vocabulary in the field as a recognition score W3.

Step 3: acquire a respective integrated score value of the speech recognition result in each respective field according to the respective confidence score values of the acoustic model in the respective fields, the confidence score values of the class-based language models in the respective fields, and the respective category score values corresponding to the respective fields; and select one speech recognition result from the speech recognition results in the respective fields as an ultimate speech recognition result according to the integrated score values.

For step 3, this embodiment does not limit the specific method for acquiring an integrated score value of each ultimate transduction result according to the confidence score values of the acoustic model in the respective fields, the confidence score values of the class-based language models in the respective fields and the category score values corresponding to the respective fields. For example, for any given field, an integrated score value of a speech recognition result in the field can be acquired according to a formula $$\text{score} = \alpha * CM(w_i) + \beta * ppl + \gamma(W);$$

where parameters $\alpha$, $\beta$ and $\gamma$ are empirical values, $CM(w_i)$ is the confidence score value of the acoustic model in the field, ppl is the confidence score value of the language model in the field, and W is the corresponding category score value in the field. This embodiment does not limit the specific method for selecting values of parameters $\alpha$, $\beta$ and $\gamma$. For example, a test sample can be selected and divided into k equal parts. Each part in the k equal parts is taken as verification data in sequence, other k−1 equal parts are taken as training data, the k−1 equal parts are used to train a formula score=$\alpha$*CM($w_i$)+$\beta$*ppl+$\gamma$(W) to obtain the values of parameters $\alpha$, $\beta$ and $\gamma$, and the verification data is used to verify the values of parameters $\alpha$, $\beta$ and $\gamma$ after the training.

In addition, this embodiment does not limit the selection standard of selecting one speech recognition result in a field from the speech recognition results in the respective fields as an ultimate speech recognition result according to the integrated score values. For example, a speech recognition result corresponding to a maximum integrated score value can be selected from the speech recognition results in multiple fields as an ultimate speech recognition result according to the integrated score values.

Specifically, for a segment of speech, suppose that an integrated score value of the speech in the science and technology field is 90 and the integrate score value of the speech in the digital science and technology field is 80, an ultimate transduction result corresponding to the science and technology field has a maximum integrated score value is selected as the speech recognition result.

In this method, by mining sentences in data samples, acquiring a class vocabulary, a class training corpus and a high-frequency language template, and training them to obtain a template-based language model, a class-based language model and a lexicon-based language model, achieves increase of the number of language models without increasing the number of data samples, thereby improving accuracy of using the template-based language model, the class-based language model and the lexicon-based language model for speech recognition.

Figure 5:
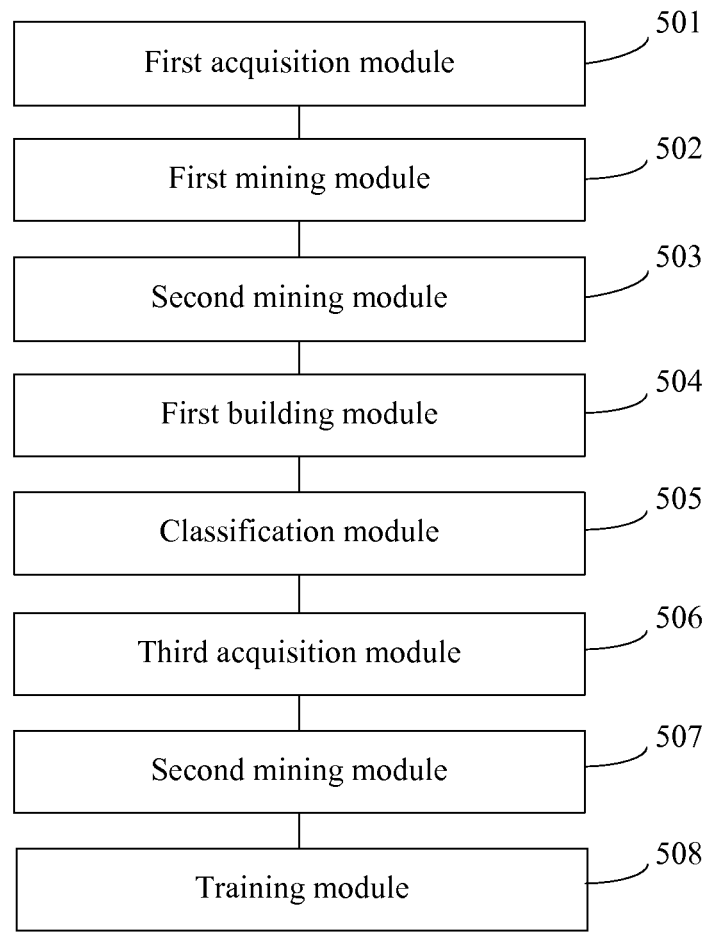
FIG. 5 is a schematic structural view of an apparatus for building language models in accordance with some embodiments.

In some embodiments, an apparatus for building language models according to the method for building language models described above are provided. Referring to FIG. 5, the apparatus includes:

a first acquisition module 501, used for acquiring data samples;

a first mining module 502, used for performing categorized sentence mining on sentences in the data samples, and take the sentences obtained through mining as results of data mining;

a second acquisition module 503, used for categorized training samples according to the results of data mining;

a first building module 504, used for building a text classifier according to the categorized training samples a classification module 505, used for classifying the data samples using the text classifier to obtain a respective class vocabulary and a respective training corpus for each of a plurality of categories;

a third acquisition module 506, used for obtaining a respective class vocabulary and a respective training corpus for each of a plurality of categories according to classification results;

a second mining module 507, used for the respective training corpus for each category according to the respective class vocabulary for the category to obtain a respective set of high-frequency language templates; and a training module 508, used for training on the respective set of high-frequency language templates for each category to obtain a respective template-based language model for the category; training on the respective training corpus for each category to obtain a respective class-based language model for the category; and training on the respective class vocabulary for each category to obtain a respective lexicon-based language model.

Figure 6:
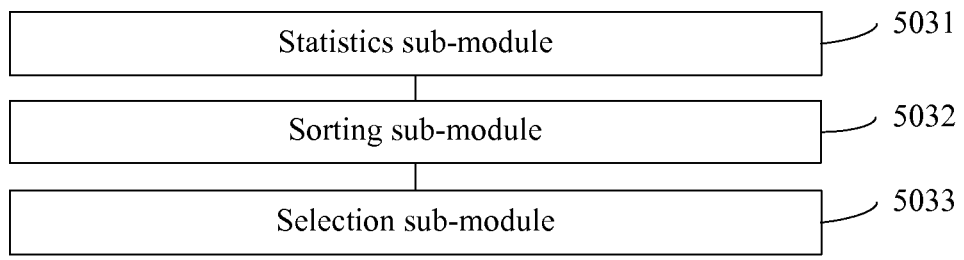
FIG. 6 is a schematic structural view of a second acquisition module in accordance with some embodiments.

Referring to FIG. 6, the second acquisition module 503 includes:

a statistics sub-module 5031, used for obtaining frequency statistics for the sentences obtained through the categorized sentence mining;

a sorting sub-module 5032, used for sorting the sentences in each category according to the frequency statistics; and a selection sub-module 5033, used for selecting respective training samples for each category from the sentences obtained through the categorized sentence mining according to a result of the sorting.

Further, the first building module 504 is used for obtaining statistical information on a tf-idf (Term Frequency-Inverse Document Frequency) feature and mutual information for the sentences in the respective training samples for each category, and building the text classifier according to the obtained statistical information.

Further, the classification module 505 is used for mining for sentences with a high degree of similarity in the data samples through the text classifier to obtain classification results comprising highly similar sentences.

The third acquisition module 506 is used for obtaining term frequency statistics on sentences in the classification results; selecting class words according to the term frequency statistics to obtain the respective class vocabulary for each of the plurality of categories; and taking sentences corresponding to the class words in the respective class vocabulary for each category as the respective training corpus for the category.

Figure 7:
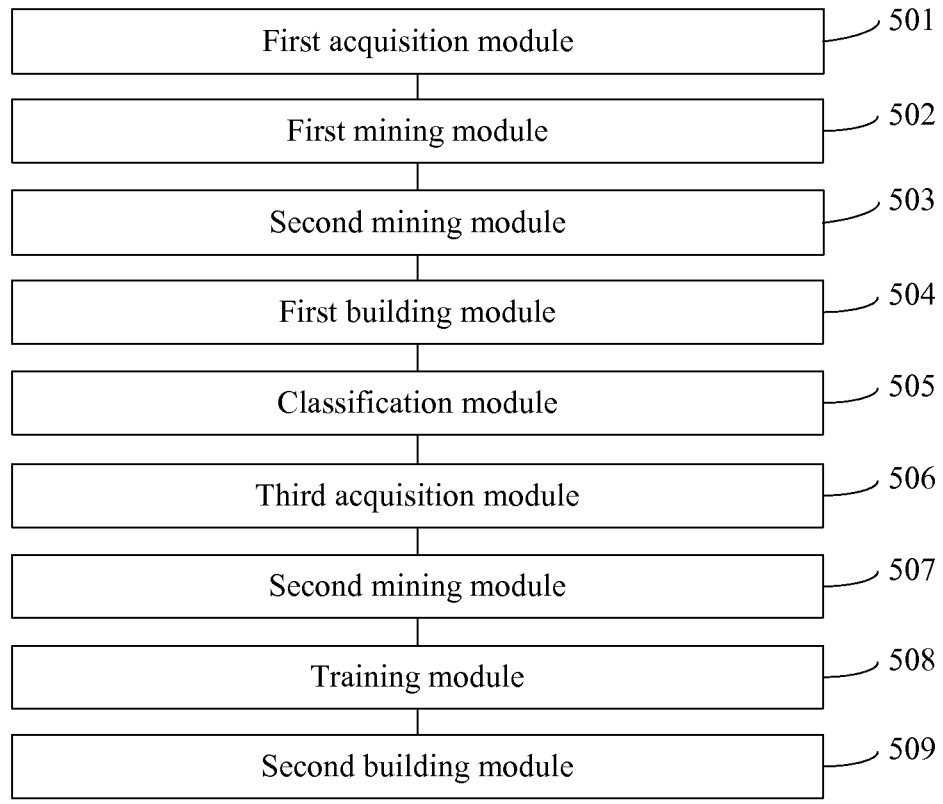
FIG. 7 is a schematic structural view of another apparatus for building language models in accordance with some embodiments.

Referring to FIG. 7, for the template-based language model, the lexicon-based language model and the class-based language model in any given field, and the apparatus further includes:

a second building module 509, used for building a speech to text decoder according to a previously obtained acoustic model, the respective class-based language model and the respective lexicon-based language model for the given field, and the data samples.

Figure 8:
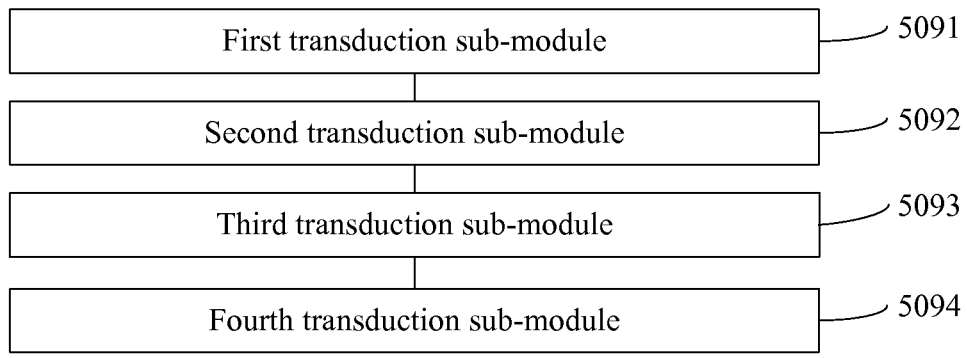
FIG. 8 is a first schematic structural view of a second building module in accordance with some embodiments.

Referring to FIG. 8, the second building module 509 includes:

a first transduction sub-module 5091, used for performing weighted finite state transduction on the respective class-based language model in the given field, to obtain a respective class-based language model WFST (Weighted Finite State Transducer); performing weighted finite state transduction on the respective lexicon-based language model in the given field, to obtain a respective class vocabulary WFST;

a second transduction sub-module 5092, used for performing weighted finite state transduction on the respective class-based language model WFST and the respective class vocabulary WFST in the given field, to obtain a fused language model WFST;

a third transduction sub-module 5093, used for performing weighted finite state transduction on the data samples, to obtain a respective vocabulary WFST; performing weighted finite state transduction on the vocabulary WFST and the fused language model WFST, to obtain a vocabulary language WFST; and a fourth transduction sub-module 5094, used for performing weighted finite state transduction on the acoustic model, to obtain an acoustic model WFST; performing weighted finite state transduction on the acoustic model WFST and the vocabulary language WFST, to obtain an ultimate WFST; and taking the ultimate WFST as the speech-to-text decoder in the given field.

Figure 9:
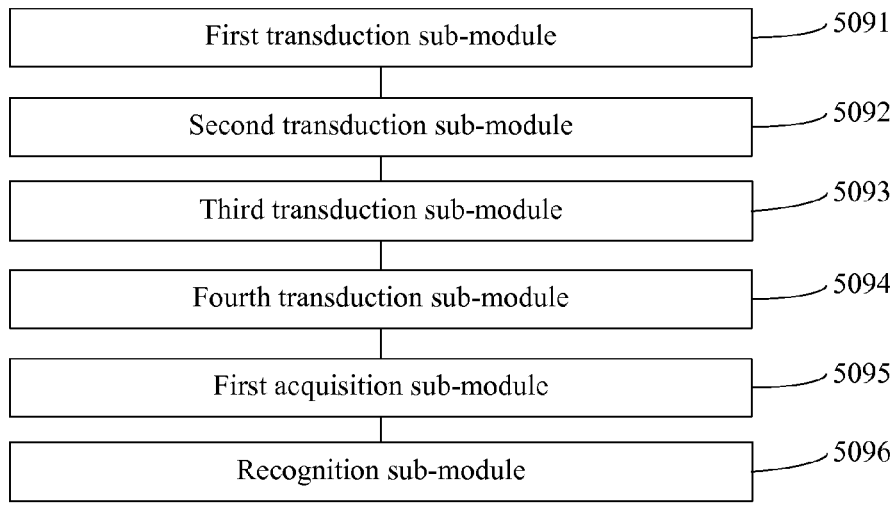
FIG. 9 is a second schematic structural view of the second building module in accordance with some embodiments.

Referring to FIG. 9, the second building module 509 further includes:

a first acquisition sub-module 5095, used for obtaining speech features of speech data; and a recognition sub-module 5096, used for inputting the speech features into the speech-to-text decoder for the given field to obtain a respective speech recognition result in the given field.

Further, the recognition sub-module 5096 is further used inputting the speech features into respective speech-to-text decoders for multiple fields in parallel, to obtain respective speech recognition results in the multiple fields.

Figure 10:
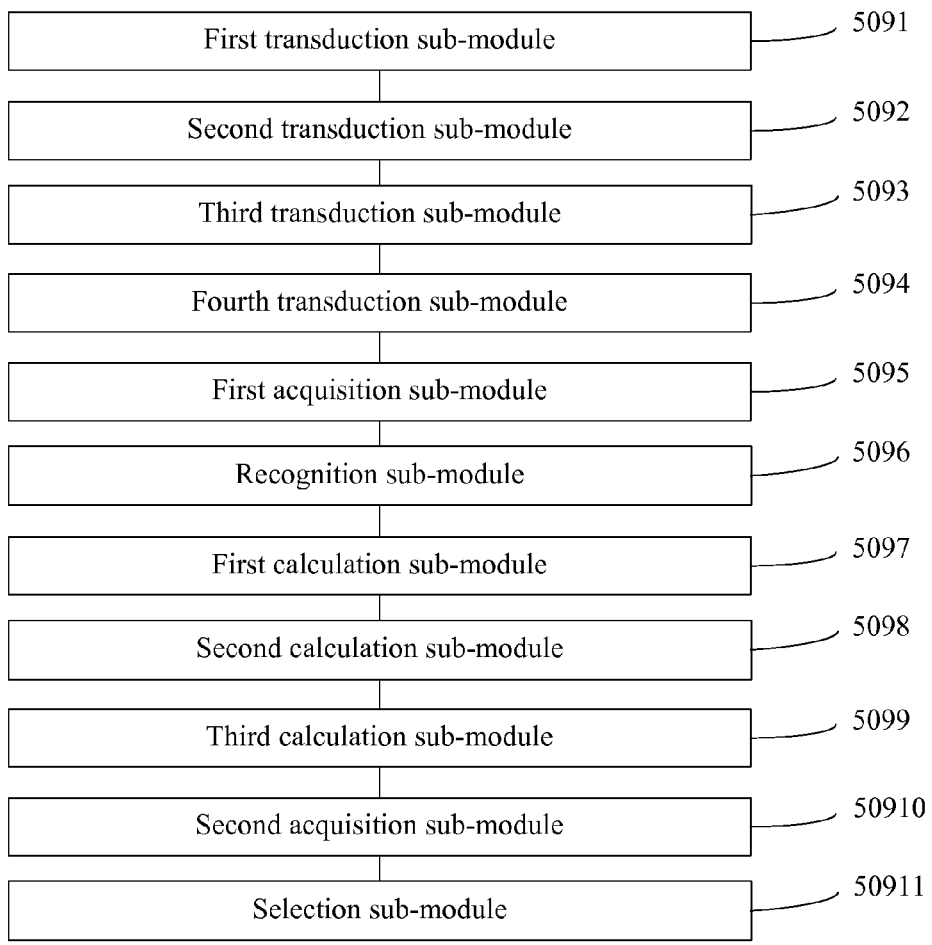
FIG. 10 is a third schematic structural view of the second building module in accordance with some embodiments.

Referring to FIG. 10, the second building module 509 further includes:

a first calculation sub-module 5097, used for calculating respective confidence scores of the acoustic model in the multiple fields, according to the respective speech recognition results in the multiple fields;

a second calculation sub-module 5098, used for calculating respective confidence scores of the respective class-based language models in the multiple fields and respective category scores corresponding to the multiple fields, according to the respective speech recognition results in the multiple fields;

a third calculation sub-module 5099, used for calculating respective category scores corresponding to the multiple fields, according to the respective speech recognition results in the multiple fields;

a second acquisition sub-module 50910, used for acquiring respective integrated scores for the respective speech recognition results in the multiple fields according to the respective confidence scores of the acoustic model in the multiple fields, the respective confidence scores of the respective class-based language models in the multiple fields, and the respective category scores corresponding to the multiple fields; and a selection sub-module 50911, used for selecting one speech recognition result from the respective speech recognition results in the multiple fields as an ultimate speech recognition result according to the respective integrated scores for the respective speech recognition results in the multiple fields.

Figure 11:
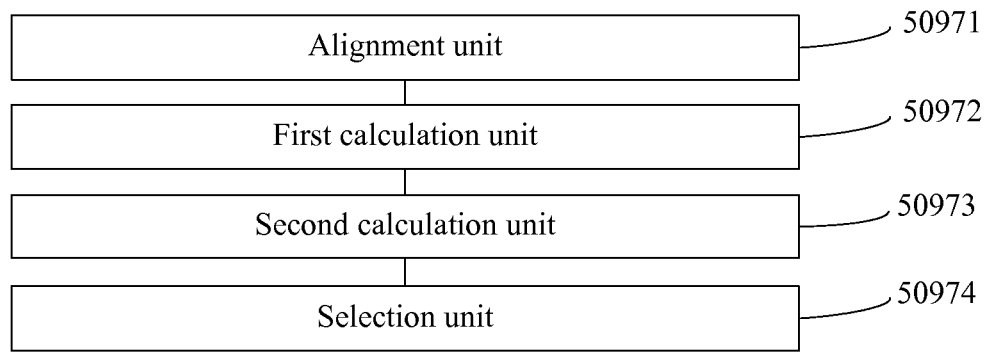
FIG. 11 is a schematic structural view of a first calculation sub-module in accordance with some embodiments.

Referring to FIG. 11, the first calculation sub-module 5097 includes:

an alignment unit 50971, used for aligning the respective speech recognition results in the multiple fields;

a first calculation unit 50972, used for respectively calculating the respective confidence scores of the aligned speech recognition results in the multiple fields on the phoneme level;

a second calculation unit 50973, used for calculating respective confidence scores of the speech recognition results in the multiple fields on the keyword level according to the confidence scores of the speech recognition results in the multiple fields on the phoneme level; and a selection unit 50974, used for selecting one confidence score of the speech recognition result in each field from the respective confidence scores of the speech recognition results in the multiple fields on the keyword level, according to the respective confidence scores on the keyword level, as the respective confidence scores of the acoustic model in the multiple fields.

Further, the first calculation unit 50972 is used for calculating the respective confidence score values of the aligned speech recognition results in the multiple fields on the phoneme level according to a formula $$CM(ph_i) = \frac{1}{e[i] - b[i] + 1} \sum_{n=b[i]}^{e[i]} \log \frac{p(o^{(n)} \mid q^{(n)}) p(q^{(n)})}{p(o^{(n)})};$$

where $ph_i$ is the ith phoneme, wherein the phoneme starts from a start frame and ends to an end frame, $b[i]$ is the start frame of $ph_i$, $e[i]$ is the end frame of $ph_i$, $o^{(n)}$ is the observation sequence corresponding to $ph_i$, and $q^{(n)}$ is the state sequence corresponding to $ph_i$.

Further, the second calculation unit 50973 is used for calculating the respective confidence score values of the speech recognition results in the multiple fields on the keyword level according to a formula $$CM(w) = \frac{1}{m} \sum_{i=1}^{m} CM(ph_i);$$

where m is the number of phonemes included in the keyword w.

Further, the selection unit 50974 is used for selecting a maximum confidence score value the speech recognition results on the keyword level in a respective field as a respective confidence score value of the acoustic model in the field according to a formula $$CM(w_i) = \max_{Tr_p(w_i)} \frac{1}{N(S(w_i))} \sum_{j} CM(Tr_p(w_i) \mid S_j(w_i));$$

where $S_j(w_i)$ is the jth audio sample for acoustic model training, $Tr_p(w_i)$ is the ith pronunciation sequence in the jth audio sample, and $N(S(w_i))$ is the number of the audio samples.

Further, the second calculation sub-module 5098 is used for calculating confidence of the class-based language model in respective fields according to a formula $$ppl = \log\left(\prod_{i=1} p(t_i)\right) \Big/ Sen + \text{Word};$$

where $t_i$ denotes the ith word, Sen denotes the total number of sentences in the speech recognition result in the given field, and Word denotes the total number of words in the sentences.

Figure 12:
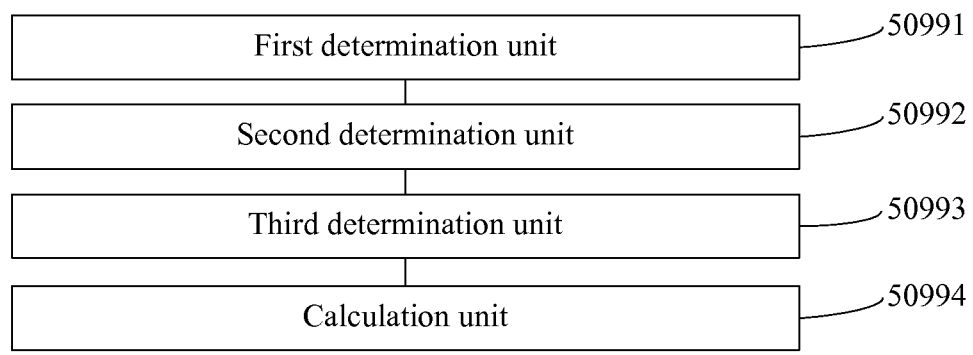
FIG. 12 is a schematic structural view of a third calculation sub-module in accordance with some embodiments.

Referring to FIG. 12, the third calculation sub-module 5099 includes:

a first determination unit 50991, used for respectively obtaining a respective set of keywords from the respective speech recognition results in the multiple respective fields, and determining a respective recognition score W1 for each respective field according to a respective frequency of occurrence of the respective set of keywords in the respective class vocabulary of the respective field;

a second determination unit 50992, used for respectively putting the respective speech recognition results in each respective field into the text classifier, to obtain a respective text classification probability weight W2 for the respective field;

a third determination unit 50993, used for respectively recognizing a respective set of entity words (e.g., proper nouns, entity names, etc.) in the speech recognition results in each respective field, and determining a respective recognition score W3 according to a frequency of occurrence of the respective set of entity words in the respective class vocabulary of the respective field; and a calculation unit 50994, used for calculating a respective category score value of the respective field according to a formula W=W1+W2+W3, and taking the respective category score values as respective category scores corresponding to the multiple respective fields.

Further, the second acquisition sub-module 50910 is used for acquiring a respective integrated score value of the speech recognition results in each respective field according to a formula $$\text{score} = \alpha^* CM(w_i) + \beta^* ppl + \gamma(W);$$

where $\alpha$, $\beta$ and $\gamma$ are any value not less than zero, $CM(w_i)$ is the respective confidence score value of the acoustic model in the respective field, ppl is the respective confidence score value of the class-based language model in the respective field, and W is the corresponding category score of the respective field.

Further, the selection sub-module 50911 is used for selecting a speech recognition result corresponding to a maximum integrated score value from the respective speech recognition results in the multiple fields as an ultimate speech recognition result according to the integrated score values in the multiple fields.

In this apparatus, by mining sentences in data samples, acquiring a class vocabulary, a class training corpus and a set of high-frequency language templates and training them to obtain a template-based language model, a class-based language model and a lexicon-based language model, achieves increase of the number of language models without increasing the number of data samples, thereby improving accuracy of using the template-based language model, the class-based language model and the lexicon-based language model for speech recognition.

Figure 13:
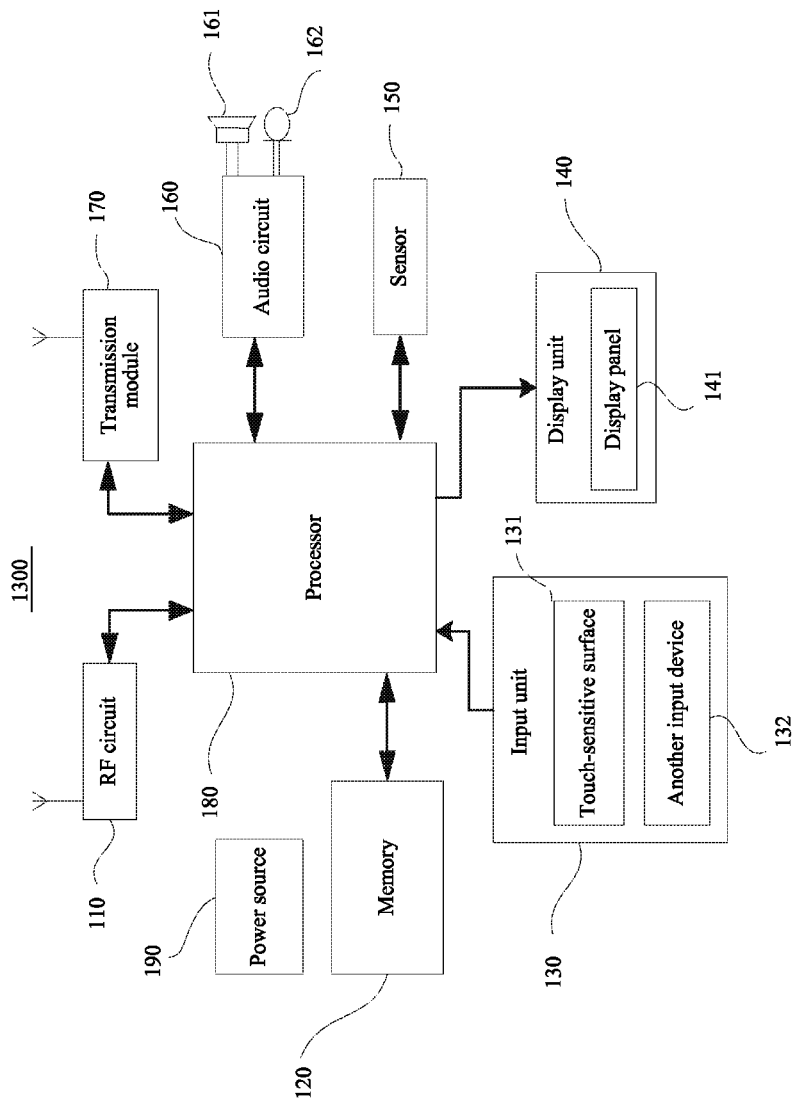
FIG. 13 is a schematic structural view of device in accordance with some embodiments.

FIG. 13 is a schematic structural view of a device that can be used for implementing the method and apparatus described above. Specifically:

A device 1300 may include components such as an RF (Radio Frequency) circuit 110, a memory 120 including one or more computer-readable storage medium, an input unit 130, a display unit 140, a sensor 150, an audio circuit 160, a transmission module 170, a processor 180 including one or more processing cores, and a power source 190. Persons skilled in the art can understand that, the terminal structure shown in FIG. 13 does not limit various embodiments of the present invention, which may include more or less components than those in FIG. 13, or combine with some components, or have different component arrangements.

The RF circuit 110 may be used for receiving and sending signals during information receiving and sending or a call, particularly, after receiving downlink information of a base station, handing the information over to one or more processors 180 for processing; and besides, sending data involving uplink to the base station.

The memory 120 may be used for storing software programs, instructions, and modules, as software programs and modules corresponding to the apparatus for building language models described above. The processor 180 executes various functional applications and data processing by running software programs, instructions, and modules stored in the memory 120, to actually build speech and/or language models and speech recognition. The memory 120 may mainly include a program storage region and a data storage region, wherein the program storage region may store an operating system, applications required by at least one function (such as sound playback function, image playback function), and so on; the data storage region may store data (such as audio data, phone book) created according to use of the device 1300. In addition, the memory 120 may include a high-speed random access memory, and also may include a non-volatile memory, for example, at least one disk storage device, a flash memory device, or other volatile solid-state storage devices. Correspondingly, the memory 120 also may include a memory controller, to provide access of the processor 180 and the input unit 130 to the memory 120. Specifically, the memory 120 may store one or more of the modules shown in FIGS. 5-12.

The input unit 130 may be used for receiving input numeric or character information, and generating keyboard, mouse, joystick, optical or trackball signal input relevant to user setting and function control. Specifically, the input unit 130 may include a touch-sensitive surface 131 and another input device 132. The touch-sensitive surface 131, also called a touch screen or a touchpad, may collect a user's touch operation thereon or nearby (e.g., user's operation on the touch-sensitive surface 131 or near the touch-sensitive surface 131 with a finger, a stylus and any other suitable object or accessory), and drive a corresponding connection device according to a preset program.

The display unit 140 may be used for displaying information input by the user or information provided for the user and various graphical user interfaces of the device 1300, and the graphical user interfaces may be composed of graphics, texts, icons, videos or any combination thereof. The display unit 140 may include a display panel 141, and optionally, the display panel 141 may be configured in forms such as LCD (Liquid Crystal Display) or OLED (Organic Light-Emitting Diode).

The device 1300 also may include at least one sensor 150, for example, an optical sensor, a motion sensor and other sensors.

An audio circuit 160, a speaker 161 and a microphone 162 may provide audio interfaces between the user and the device 1300. The audio circuit 160 may convert received audio data into an electric signal, and then transmit the electric signal to the speaker 161, which is converted into a sound signal by the speaker 161 for output; on the other hand, the microphone 162 converts the collected sound signal into an electric signal, which is received by the audio circuit 160 and then converted into audio data, after the audio data is output to the processor 180 for processing, it is sent to, for example, another terminal via the RF circuit 110, or the audio data is output to the memory 120 for further processing. The audio circuit 160 may further include an earplug jack, to provide communication between a peripheral headset and the device 1300.

The processor 180 is a control center of the device 1300, uses various interfaces and lines to connect various parts of the whole mobile phone, by running or executing software programs and/or modules stored in the memory 120, and calling data stored in the memory 120, executes various functions of the device 1300 and processes data, thereby monitoring the mobile phone as a whole. Optionally, the processor 180 may include one or more processing cores.

The device 1300 also may include a power source 190 (e.g., battery) supplying power for various parts.

Specifically, in some embodiments, the device may include a memory and one or more processors, wherein the one or more programs are stored in the memory, and include instructions to be executed by the processors to perform the operations described in the above methods.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. However it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of building a speech to text decoder, comprising:

at a device having one or more processors and memory:
acquiring data samples for building a language model;
performing categorized sentence mining in the acquired data samples to obtain mining results comprising a respective set of sentences obtained through the categorized sentence mining for each of a plurality of categories;
obtaining categorized training samples based on the mining results;
building a text classifier based on the categorized training samples;
classifying the data samples using the text classifier to obtain a respective class vocabulary and a respective training corpus for each of a plurality of categories;
mining the respective training corpus for each category according to the respective class vocabulary for the category to obtain a respective set of high-frequency language templates;
performing training on the respective set of high-frequency language templates for each category to obtain a respective template-based language model for the category;
performing training on the respective training corpus for each category to obtain a respective class-based language model for the category; and
performing training on the respective class vocabulary for each category to obtain a respective lexicon-based language model, wherein the respective template-based language model, the respective class-based language model, and the respective lexicon-based language model for a given category are language models for a given field, and the method further comprises:
building the speech to text decoder according to a previously obtained acoustic model, the respective template-based language model, the respective class-based language model and the respective lexicon-based language model for the given field, and the data samples.

2. The method of claim 1, wherein obtaining categorized training samples based on the mining results further comprises:
obtaining frequency statistics for the sentences obtained through the categorized sentence mining;
sorting the sentences in each category according to the frequency statistics; and
selecting respective training samples for each category from the sentences obtained through the categorized sentence mining according to a result of the sorting.

3. The method of claim 1, wherein building the text classifier based on the categorized training samples further comprises:
obtaining statistical information on a tf-idf (Term Frequency-Inverse Document Frequency) feature and mutual information for the sentences in the respective training samples for each category; and
building the text classifier according to the obtained statistical information.

4. The method of claim 1, wherein:
classifying the data samples using the text classifier to obtain the respective class vocabulary and the respective training corpus for each of a plurality of categories further comprises:
mining for sentences with a high degree of similarity in the data samples through the text classifier to obtain classification results comprising highly similar sentences;
obtaining term frequency statistics on sentences in the classification results;
selecting class words according to the term frequency statistics to obtain the respective class vocabulary for each of the plurality of categories; and
taking sentences corresponding to the class words in the respective class vocabulary for each category as the respective training corpus for the category.

5. The method of claim 1, wherein building the speech to text decoder according to the previously obtained acoustic model, the respective template-based language model, the respective class-based language model and the respective lexicon-based language model for the given field, and the data samples further comprises:
obtaining an expanded class-based language model for the given field by expanding the respective class-based language model using one or more sentences obtained through combining one or more templates from the respective template-based language model and one or more words from the respective lexicon-based language model; and
building the speech to text decoder based on the expanded class-based language model and the lexicon-based language model for the given field, and the data samples.

6. The method of claim 5, wherein building the speech to text decoder according to the previously obtained acoustic model, the respective template-based language model, the respective class-based language model and the respective lexicon-based language model for the any given field, and the data samples, further comprises:
performing weighted finite state transduction on the respective class-based language model in the given field, to obtain a respective class-based language model WFST (Weighted Finite State Transducer);
performing weighted finite state transduction on the respective lexicon-based language model in the given field, to obtain a respective class vocabulary WFST;
performing weighted finite state transduction on the respective class-based language model WFST and the respective class vocabulary WFST in the given field, to obtain a fused language model WFST;
performing weighted finite state transduction on the data samples, to obtain a respective vocabulary WFST;
performing weighted finite state transduction on the vocabulary WFST and the fused language model WFST, to obtain a vocabulary language WFST;
performing weighted finite state transduction on the acoustic model, to obtain an acoustic model WFST;
performing weighted finite state transduction on the acoustic model WFST and the vocabulary language WFST, to obtain an ultimate WFST; and
taking the ultimate WFST as the speech-to-text decoder in the given field.

7. The method of claim 6, wherein after performing weighted finite state transduction on the acoustic model WFST and the vocabulary language WFST to obtain an ultimate WFST, and taking the ultimate WFST as the speech-to-text decoder in the given field, the method further comprises:
obtaining speech features of speech data; and
inputting the speech features into the speech-to-text decoder for the given field to obtain a respective speech recognition result in the given field.

8. The method of claim 6, wherein after performing weighted finite state transduction on the acoustic model WFST and the vocabulary language WFST to obtain an ultimate WFST, and taking the ultimate WFST as the speech-to-text decoder in the given field, the method further comprises:

obtaining speech features of speech data;

inputting the speech features into respective speech-to-text decoders for multiple fields in parallel, to obtain respective speech recognition results in the multiple fields;

calculating respective confidence scores of the acoustic model in the multiple fields, respective confidence scores of the respective class-based language models in the multiple fields and respective category scores corresponding to the multiple fields, according to the respective speech recognition results in the multiple fields;

based on the respective confidence scores of the acoustic model in the multiple fields, the respective confidence scores of the respective class-based language models in the multiple fields, and the respective category scores corresponding to the multiple fields, acquiring respective integrated scores for the respective speech recognition results in the multiple fields; and selecting one speech recognition result from the respective speech recognition results in the multiple fields as an ultimate speech recognition result according to the respective integrated scores for the respective speech recognition results in the multiple fields.

9. A system for building a speech to text decoder, comprising:

one or more processors; and memory having instructions stored thereon, the instructions, when executed by the processors, cause the processors to perform operations comprising:

acquiring data samples for building a language model;

performing categorized sentence mining in the acquired data samples to obtain mining results comprising a respective set of sentences obtained through the categorized sentence mining for each of a plurality of categories;

obtaining categorized training samples based on the mining results;

building a text classifier based on the categorized training samples;

classifying the data samples using the text classifier to obtain a respective class vocabulary and a respective training corpus for each of a plurality of categories;

mining the respective training corpus for each category according to the respective class vocabulary for the category to obtain a respective set of high-frequency language templates;

performing training on the respective set of high-frequency language templates for each category to obtain a respective template-based language model for the category;

performing training on the respective training corpus for each category to obtain a respective class-based language model for the category; and performing training on the respective class vocabulary for each category to obtain a respective lexicon-based language model, wherein the respective template-based language model, the respective class-based language model, and the respective lexicon-based language model for a given category are language models for a given field, and the operations further comprise:

building the speech to text decoder according to a previously obtained acoustic model, the respective template-based language model, the respective class-based language model and the respective lexicon-based language model for the given field, and the data samples.

10. The system of claim 9, wherein obtaining categorized training samples based on the mining results further comprises:

obtaining frequency statistics for the sentences obtained through the categorized sentence mining;

sorting the sentences in each category according to the frequency statistics; and selecting respective training samples for each category from the sentences obtained through the categorized sentence mining according to a result of the sorting.

11. The system of claim 9, wherein building the text classifier based on the categorized training samples further comprises:

obtaining statistical information on a tf-idf (Term Frequency-Inverse Document Frequency) feature and mutual information for the sentences in the respective training samples for each category; and building the text classifier according to the obtained statistical information.

12. The system of claim 9, wherein:

classifying the data samples using the text classifier to obtain the respective class vocabulary and the respective training corpus for each of a plurality of categories further comprises:

mining for sentences with a high degree of similarity in the data samples through the text classifier to obtain classification results comprising highly similar sentences;

obtaining term frequency statistics on sentences in the classification results;

selecting class words according to the term frequency statistics to obtain the respective class vocabulary for each of the plurality of categories; and taking sentences corresponding to the class words in the respective class vocabulary for each category as the respective training corpus for the category.

13. The system of claim 9, wherein building the speech to text decoder according to the previously obtained acoustic model, the respective template-based language model, the respective class-based language model and the respective lexicon-based language model for the given field, and the data samples further comprises:

obtaining an expanded class-based language model for the given field by expanding the respective class-based language model using one or more sentences obtained through combining one or more templates from the respective template-based language model and one or more words from the respective lexicon-based language model; and building the speech to text decoder based on the expanded class-based language model and the lexicon-based language model for the given field, and the data samples.

14. The system of claim 13, wherein building the speech to text decoder according to the previously obtained acoustic model, the respective template-based language model, the respective class-based language model and the respective lexicon-based language model for the any given field, and the data samples, further comprises:

performing weighted finite state transduction on the respective class-based language model in the given field, to obtain a respective class-based language model WFST (Weighted Finite State Transducer);

performing weighted finite state transduction on the respective lexicon-based language model in the given field, to obtain a respective class vocabulary WFST;

performing weighted finite state transduction on the respective class-based language model WFST and the respective class vocabulary WFST in the given field, to obtain a fused language model WFST;

performing weighted finite state transduction on the data samples, to obtain a respective vocabulary WFST;

performing weighted finite state transduction on the vocabulary WF ST and the fused language model WFST, to obtain a vocabulary language WFST;

performing weighted finite state transduction on the acoustic model, to obtain an acoustic model WFST;

performing weighted finite state transduction on the acoustic model WF ST and the vocabulary language WFST, to obtain an ultimate WFST; and taking the ultimate WFST as the speech-to-text decoder in the given field.

15. The system of claim 14, wherein after performing weighted finite state transduction on the acoustic model WFST and the vocabulary language WF ST to obtain an ultimate WFST, and taking the ultimate WF ST as the speech-to-text decoder in the given field, the operations further comprise:

obtaining speech features of speech data; and inputting the speech features into the speech-to-text decoder for the given field to obtain a respective speech recognition result in the given field.

16. The system of claim 14, wherein after performing weighted finite state transduction on the acoustic model WFST and the vocabulary language WF ST to obtain an ultimate WFST, and taking the ultimate WF ST as the speech-to-text decoder in the given field, the operations further comprise:

obtaining speech features of speech data;

inputting the speech features into respective speech-to-text decoders for multiple fields in parallel, to obtain respective speech recognition results in the multiple fields;

calculating respective confidence scores of the acoustic model in the multiple fields, respective confidence scores of the respective class-based language models in the multiple fields and respective category scores corresponding to the multiple fields, according to the respective speech recognition results in the multiple fields;

based on the respective confidence scores of the acoustic model in the multiple fields, the respective confidence scores of the respective class-based language models in the multiple fields, and the respective category scores corresponding to the multiple fields, acquiring respective integrated scores for the respective speech recognition results in the multiple fields; and selecting one speech recognition result from the respective speech recognition results in the multiple fields as an ultimate speech recognition result according to the respective integrated scores for the respective speech recognition results in the multiple fields.

17. A non-transitory computer-readable medium having instructions stored thereon, the instructions, when executed by the processors, cause the processors to perform operations comprising:

acquiring data samples for building a language model;

performing categorized sentence mining in the acquired data samples to obtain mining results comprising a respective set of sentences obtained through the categorized sentence mining for each of a plurality of categories;

obtaining categorized training samples based on the mining results;

building a text classifier based on the categorized training samples;

classifying the data samples using the text classifier to obtain a respective class vocabulary and a respective training corpus for each of a plurality of categories;

mining the respective training corpus for each category according to the respective class vocabulary for the category to obtain a respective set of high-frequency language templates;

performing training on the respective set of high-frequency language templates for each category to obtain a respective template-based language model for the category;

performing training on the respective training corpus for each category to obtain a respective class-based language model for the category; and performing training on the respective class vocabulary for each category to obtain a respective lexicon-based language model, wherein the respective template-based language model, the respective class-based language model, and the respective lexicon-based language model for a given category are language models for a given field, and the operations further comprise:

building the speech to text decoder according to a previously obtained acoustic model, the respective template-based language model, the respective class-based language model and the respective lexicon-based language model for the given field, and the data samples.

18. The computer-readable medium of claim 17, wherein building the speech to text decoder according to the previously obtained acoustic model, the respective template-based language model, the respective class-based language model and the respective lexicon-based language model for the given field, and the data samples further comprises:

obtaining an expanded class-based language model for the given field by expanding the respective class-based language model using one or more sentences obtained through combining one or more templates from the respective template-based language model and one or more words from the respective lexicon-based language model; and building the speech to text decoder based on the expanded class-based language model and the lexicon-based language model for the given field, and the data samples.

19. The computer-readable medium of claim 18, wherein building the speech to text decoder according to the previously obtained acoustic model, the respective template-based language model, the respective class-based language model and the respective lexicon-based language model for the any given field, and the data samples, further comprises:

performing weighted finite state transduction on the respective class-based language model in the given field, to obtain a respective class-based language model WFST (Weighted Finite State Transducer);

performing weighted finite state transduction on the respective lexicon-based language model in the given field, to obtain a respective class vocabulary WFST;

performing weighted finite state transduction on the respective class-based language model WFST and the respective class vocabulary WFST in the given field, to obtain a fused language model WFST;

performing weighted finite state transduction on the data samples, to obtain a respective vocabulary WFST;

performing weighted finite state transduction on the vocabulary WFST and the fused language model WFST, to obtain a vocabulary language WFST;

performing weighted finite state transduction on the acoustic model, to obtain an acoustic model WFST;

performing weighted finite state transduction on the acoustic model WFST and the vocabulary language WFST, to obtain an ultimate WFST; and taking the ultimate WFST as the speech-to-text decoder in the given field.

20. The computer-readable medium of claim 19, wherein after performing weighted finite state transduction on the acoustic model WFST and the vocabulary language WFST to obtain an ultimate WFST, and taking the ultimate WFST as the speech-to-text decoder in the given field, the operations further comprise:

obtaining speech features of speech data;

inputting the speech features into respective speech-to-text decoders for multiple fields in parallel, to obtain respective speech recognition results in the multiple fields;

calculating respective confidence scores of the acoustic model in the multiple fields, respective confidence scores of the respective class-based language models in the multiple fields and respective category scores corresponding to the multiple fields, according to the respective speech recognition results in the multiple fields;

based on the respective confidence scores of the acoustic model in the multiple fields, the respective confidence scores of the respective class-based language models in the multiple fields, and the respective category scores corresponding to the multiple fields, acquiring respective integrated scores for the respective speech recognition results in the multiple fields; and selecting one speech recognition result from the respective speech recognition results in the multiple fields as an ultimate speech recognition result according to the respective integrated scores for the respective speech recognition results in the multiple fields.

* * * * *